United States Patent Office 2,786,870
Patented Mar. 26, 1957

2,786,870

SYNTHESIS OF CHLORAMPHENICOL AND RELATED ACYLAMIDODIOLS

Ronald Slack, Chelsea, England, assignor to Parke Davis & Company, Detroit, Mich., a corporation of Michigan No Drawing. Application April 19, 1954,
Serial No. 424,280

9 Claims. (Cl. 260—562)

The invention relates to a synthesis of 2-dichloracetamido-1-p-nitrophenylpropane 1,3-diol. The optically active D-threo isomer of this acylamido diol is chloramphenicol, an important therapeutic agent having antibiotic activity.

This application is a continuation-in-part of my application Serial No. 199,937, filed December 8, 1950, now abandoned.

The starting material for the synthesis of this invention is an oxazoline of the class having the formula I
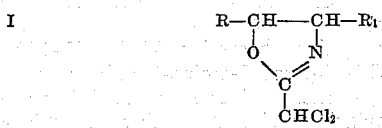

where R represents a p-nitrophenyl group and $R_1$ represents a hydroxymethyl group or R represents a hydrogen atom and $R_1$ represents a p-nitrophenyl hydroxymethyl group.

These oxazolines can be prepared as described in my copending application Serial No. 199,936, filed December 8, 1950, now U. S. Patent 2,718,520. They have either one or the other of the formulas as follows:

II
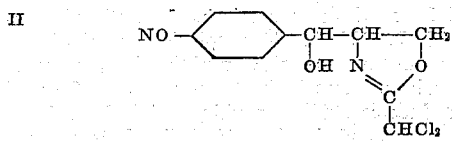

III
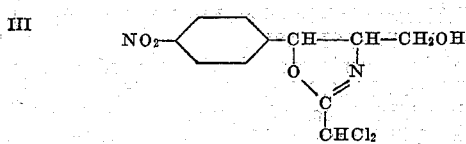

The oxazolines can be prepared by reacting a 2-amino-1-p-nitrophenylpropane 1,3-diol of the formula IV
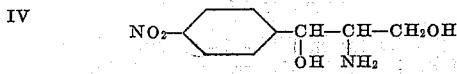

with an iminoether of the type:

V

where $R_2$ is lower alkyl or with an acid addition salt of such ether. The resultant reaction mixture contains corresponding compounds of both types II and III which can be separated as, for example, by fractional crystallization or chromatography.

The amino-diol of Formula IV, of course, contains two asymmetric carbon atoms and can exist in erythro and threo forms each of which can occur as racemate or D or L isomers. In the process of converting aminodiol into oxazoline above described there is no substantial inversion of erythro to threo form, or vice versa. There is, however, a substantial difference between the erythro and threo series as to the relative proportions of isomers of type II and type III produced. In the threo series, the proportion is substantially 2,3 while in the erythro series the product is substantially entirely erythro compound of type II with a minor percentage of erythro compound of type III.

According to the present invention, an acylamido diol of formula

VI
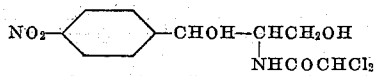

is obtained by reacting one of said oxazolines II and III under such conditions as to cause a fission of the oxazoline ring without destruction or elimination of the dichloromethyl group or other substituent of the oxazoline. This is accomplished by subjecting a solution of said oxazoline first to the action of dilute mineral acid and subsequently to the action of a base, both reactions being carried out at a temperature sufficiently low, preferably below 50° C., to avoid hydrolysis of any substituent group and to obtain a maximum yield of the desired acylamido diol without loss of the dichloromethyl group.

The oxazolines of Formulas II and III, as also the acylamido diol to which, according to the invention, they are converted by careful hydrolysis contain two asymmetric carbon atoms and can exist in structural as well as optical isomeric forms. By analogy with the nomenclature adopted by Rebstock et al. (J. A. C. S., vol. 71, pp. 2458-2473) in connection with chloramphenicol and its isomers, the structural isomeric forms are herein referred to as "erythro" and "threo" respectively. Both the erythro and threo forms can exist as racemates of optically active isomers from which it will be appreciated that, strictly speaking, each compound can exist in six different forms and that, accordingly, for a given structural formula of conventional type as used herein, there are included the complete mixture of all six forms, the racemates of the erythro and threo series and the four individual isomers L-erythro, D-erythro, L-threo and D-threo. It should be noted that the configurational representation of the isomers as D and L bears no relation to the actual sign of the rotation but refers to the configuration about the alpha carbon atoms. The D-threo isomer of Formula II has the same configuration with regard to the alpha carbon atom as the therapeutically active chloramphenicol isomer which has been designated D(—)-threo 2-dichloracetamido-1-p-nitrophenylpropane 1,3-diol.

The process of the present invention is preferably carried out by starting with previously prepared solid oxazoline, adding dilute mineral acid, warming until the oxazoline is completely dissolved, immediately cooling and neutralizing with a base. The oxazoline can be readily dissolved without exceeding 50° C. With 0.1 normal hydrochloric acid, solution will be complete within about five minutes' time. With stronger acid, such for example as 1.0 N HCl, solution can be effected in one to three minutes at 45° C. and in ten to fifteen minutes at room temperature. The temperatures employed while the oxazoline is being reacted with mineral acid should not be as high as 55° C. for more than a brief interval and preferably should never exceed such temperature. If solution is aided by warming to a temperature above 30° C., or if the oxazoline is reacted in the presence of mineral acid at a temperature above 30° C., the solution should be immediately cooled to avoid loss of any of the dichloracetamido group. The dilute mineral acid used in the process should have a normality not greater than about 2.0 and hydrochloric acid is the mineral acid of choice. The step of neutralization is preferably effected at about room temperature or below. If conducted at a temperature substantially greater than 30° C., there is the possibility of hydrolyzing the dichloracetamido group.

The process of this invention does not involve epimerization. Thus, the DL- and D-threo oxazolines of Formulas II and III respectively yield the DL- and D-threo forms of 2-dichloracetamido-1-p-nitrophenylpropane 1,3-diol and, therefore, constitute preferred starting materials in the process. The DL racemic mixture may, of course, be resolved if desired. However, the DL- and L-erythro oxazolines are also of some importance since the erythro epimers of the acylamido diol which they produce when treated by the process of the invention can be converted by epimerization into the threo forms.

The fission of the oxazoline ring which occurs during the process of this invention is believed to form an intermediate -O-dichloracetoxy derivative during the reaction under acid conditions. The intermediate is then rearranged during the neutralization step to obtain the final dichloracetamido diol compound. The following diagram illustrates the reaction with the oxazoline of Formula II:

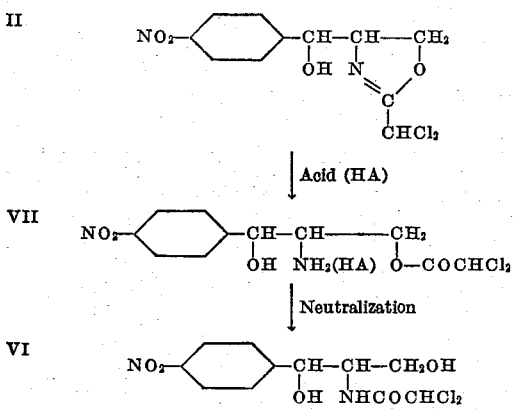

The following diagram illustrates the reaction with the oxazoline of Formula III:

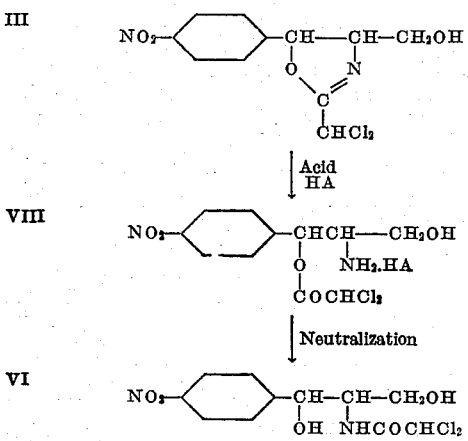

While the present application relates to the synthesis of the acylamido diol compounds of Formula VI starting from the oxazolines II and III however obtained, the invention includes the overall process of preparing 2-dichloracetamido-1-p-nitrophenylpropane 1,3-diol (especially the DL- and D-threo forms) from 2-amino-1-p-nitrophenylpropane 1,3-diol. This process comprises reacting the amino diol (preferably in the DL- or D-threo form) with a dichloracetimino ether or acid addition salt of such ether, separating from the reaction mixture either 2-dichloromethyl-4-p-nitrophenyl hydroxymethyl-$\Delta^2$-oxazoline or 2-dichloromethyl-5-p-nitrophenyl-4-hydroxymethyl-$\Delta^2$-oxazoline and treating such oxazoline with dilute acid and subsequently neutralizing the reaction mixture with a base as hereinbefore described.

The first step of this overall process is claimed in my copending application Ser. No. 199,936 above referred to.

The process of the present invention is illustrated by the following examples:

Example I

DL-threo 2-dichloromethyl-4-p-nitrophenyl hydroxymethyl-$\Delta^2$-oxazoline is prepared as follows:

DL-threo 2-amino-1-p-nitrophenylpropane 1,3-diol as prepared by the method described by Rebstock et al. (J. A. C. S., vol. 71, pp. 2458–2473) (6.7 g.) is dissolved in warm dry pyridine (40 cc.) and treated with dichloracetiminoethyl ether hydrochloride (6.7 g.). The mixture is allowed to stand at room temperature for some hours, and the pyridine hydrochloride is then removed by filtration. Evaporation of the solvent and crystallization of the residue from methanol gives the oxazoline DL-threo 2-dichloromethyl-4-p-nitrophenyl hydroxymethyl-$\Delta^2$-oxazoline, M. P. 163–164° C. Found: C, 43.2; H, 3.3; N, 9.3; Cl, 23.0. $C_{11}H_{10}O_4N_2Cl_2$ requires C, 43.25; H, 3.18; N, 9.17; Cl, 23.2%.

0.6 gm. of this oxazoline is treated with 3.0 cc.. of dilute hydrochloric acid and warmed gently to give a clear solution. Cooling followed by neutralization with aqueous ammonia results in the precipitation of DL-threo-2-dichloracetamido-1-p-nitrophenylpropane 1,3-diol M. P. 153–154° C. after crystallization from ethyl acetate-light petroleum mixture or from water containing a little methanol.

The optically pure D-threo oxazoline, M. P. 143–144° C. prepared from D(—)-threo 2-amino-1-p-nitrophenylpropane 1,3-diol in manner analogous to the DL racemate hydrolyzes similarly to give D(—)-threo 2-dichloracetamido-1-p-nitrophenylpropane 1,3-diol, M. P. 152–153° C.

Example II

DL-erythro 2-dichloromethyl-4-p-nitrophenyl hydroxymethyl-$\Delta^2$-oxazoline is prepared as follows:

1.93 g. of racemic erythro 2-amino-1-p-nitrophenylpropane 1,3-diol hydrochloride of M. P. 206–208° C. are dissolved in 15 cc. of anhydrous pyridine. To this solution is added 1.8 g. of dichloracetiminoethyl ether hydrochloride of M. P. 80° C. The solution is left for 2 hours at room temperature when pyridine hydrochloride precipitates. The mixture is then poured into 100 cc. of water. A product crystallizes rapidly and is filtered off, washed with water and dried at 100° C. It is racemic erythro 2-dichloromethyl-4-p-nitrophenyl hydroxymethyl-$\Delta^2$-oxazoline, M. P.=167–168° C.

0.5 gm. of the racemic oxazoline is dissolved at about 50° C. in 10 cc. of N/10 hydrochloric acid. On cooling there is added 2 cc. of aqueous ammonia when DL-erythro 2-dichloracetamido-1-p-nitrophenylpropane 1,3-diol melting (on recrystallization) at 170–172° C. precipitates.

Example III

D-threo 2-dichloromethyl-5-p-nitrophenyl-4-hydroxymethyl-$\Delta^2$-oxazoline is prepared as follows:

D(—)-threo 2-amino-1-p-nitrophenylpropane 1,3-diol as prepared by the method described by Rebstock et al. (J. A. C. S., vol. 71, pp. 2458–2473) (1.65 g.) is dissolved in warm dry pyridine (10 cc.) and treated with dichloracetiminoethyl ether hydrochloride (1.8 g.). The mixture is allowed to stand at room temperature for some hours, and the pyridine hydrochloride is then removed by filtration. Evaporation of the solvent and treatment with methanol gives a precipitate which is filtered off. The filtrate is evaporated to dryness and the residue fractionally crystallized from benzene to give the oxazoline D-threo 2-dichloromethyl-5-p-nitrophenyl-4-hydroxymethyl-$\Delta^2$-oxazoline, M. P. 132–133° C. and $(\alpha)_D^{20} = -13.65°$ (C=6.5% in ethyl acetate). Found: C, 42.9; H, 3.18; N, 9.15; Cl, 23.2. $C_{11}H_{10}O_4N_2Cl_2$ requires C, 43.25; H, 3.18; N, 9.17; Cl, 23.2%.

0.5 gm. of this oxazoline are treated with sufficient warm, dilute hydrochloric acid to effect complete solution. Rapid cooling, followed by addition of concentrated aqueous ammonia to neutrality gives D-threo 2-dichloracetamido-1-p-nitrophenylpropane 1,3-diol. Recrystallization from a mixture of ethyl acetate and light petroleum gives the pure compound, M. P. 151° C. $(\alpha)_D^{20} = -25°$ (in ethyl acetate).

*Example IV*

0.75 gm. of DL-threo 2-dichloromethyl-5-p-nitrophenyl-4-hydroxymethyl-$\Delta^2$-oxazoline M. P. 128–129° C. prepared in manner analogous to the isomer of Example III, are treated with 12 cc. of dilute hydrochloric acid and the mixture warmed gently to give a clear solution. Treatment with aqueous ammonia as described in Example III gives an almost theoretical yield of DL-threo 2-dichloracetamido-1-p-nitrophenylpropane 1,3-diol M. P. 150° C. after recrystallization from a mixture of ethyl acetate and light recrystallization from a mixture of ethyl acetate and light petroleum.

What I claim as my invention is:

1. Process for the preparation of 2-dichloracetamido-1-p-nitrophenylpropane 1,3-diol which comprises treating a dichloromethyl oxazoline of the class consisting of 2-dichloromethyl - 4 - hydroxymethyl - 5 - p-nitrophenyl-$\Delta^2$-oxazoline and 2-dichloromethyl-4-p-nitrophenyl-hydroxymethyl-$\Delta^2$-oxazoline with dilute acid at a temperature not over 55° C. until the oxazoline ring is opened while retaining the dichloromethyl group, followed by neutralization of the reaction mixture with a base.

2. Process according to claim 1 wherein the oxazoline starting material is a 2-dichloromethyl-4-p-nitrophenyl hydroxymethyl-$\Delta^2$-oxazoline.

3. Process according to claim 1 wherein the oxazoline starting material is a 2-dichloromethyl-5-p-nitrophenyl-4-hydroxymethyl-$\Delta^2$-oxazoline.

4. Process according to claim 1 wherein the oxazoline starting material is the reaction product obtained by reacting in an anhydrous organic solvent at substantially room temperatures a 1-p-nitrophenyl-2-aminopropane-1,3-diol with an acid addition salt of an imino ether of the formula

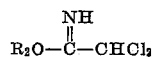

where $R_2$ is lower alkyl.

5. Process for the preparation of 2-dichloracetamido-1-p-nitrophenylpropane 1,3-diol which comprises treating a solid oxazoline of the class consisting of 2-dichloromethyl-4 - hydroxymethyl - 5 - p - nitrophenyl - $\Delta^2$ - oxazoline and 2-dichloromethyl-4-p-nitrophenyl hydroxymethyl-$\Delta^2$-oxazoline with a dilute aqueous mineral acid solution at a temperature not substantially above 50° C. until solution of said solid is obtained and neutralizing the resultant solution with ammonia.

6. A process for the preparation of D-threo 2-dichloracetamido-1-p-nitrophenylpropane 1,3-diol which comprises treating D-threo 2-dichloromethyl-4-p-nitrophenyl hydroxymethyl-$\Delta^2$-oxazoline with a dilute, aqueous solution of hydrochloric acid at a temperature not substantially above 50° C. until solution is obtained and neutralizing the resultant solution with ammonia.

7. A process for the preparation of D-threo 2-dichloracetamido-1-p-nitrophenylpropane 1,3-diol which comprises treating D-threo 2-dichloromethyl-5-p-nitrophenyl-4-hydroxymethyl-$\Delta^2$-oxazoline with a dilute, aqueous solution of hydrochloric acid at a temperature not substantially above 50° C. until solution is obtained and neutralizing the resultant solution with ammonia.

8. A process which comprises reacting an oxazoline of formula

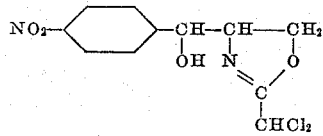

with a dilute, aqueous solution of a mineral acid at a temperature not substantially above 50° C. thereby obtaining a resultant solution of a compound having the formula

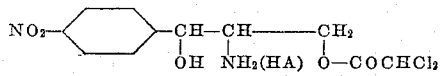

and neutralizing said resultant solution with a base thereby obtaining a final solution of a compound of formula

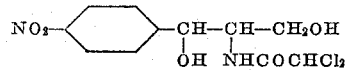

9. A process which comprises reacting an oxazoline of formula

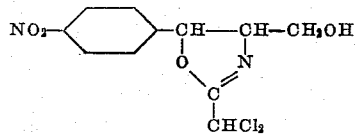

with a dilute, aqueous solution of a mineral acid at a temperature not substantially above 50° C. thereby obtaining a resultant solution of a compound having the formula

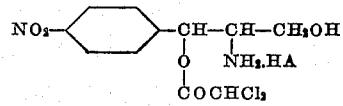

and neutralizing said resultant solution with a base thereby obtaining a final solution of a compound of formula

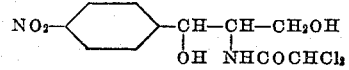

References Cited in the file of this patent

UNITED STATES PATENTS

| 2,513,346 | Moersch et al. | July 4, 1950 |
| 2,562,114 | Moersch et al. | July 24, 1951 |

FOREIGN PATENTS

| 501,678 | Belgium | Mar. 31, 1951 |